United States Patent [19]

Hata et al.

[11] Patent Number: 4,606,066
[45] Date of Patent: Aug. 12, 1986

[54] PROGRAMMABLE IMAGE PROCESSOR

[75] Inventors: Seiji Hata, Fujisawa; Hiroshi Horino; Akira Miyakawa, both of Yokohama, all of Japan

[73] Assignee: Hitachi, Ltd., Tokyo, Japan

[21] Appl. No.: 523,786

[22] Filed: Aug. 16, 1983

[30] Foreign Application Priority Data

Sep. 9, 1982 [JP] Japan .................................. 57-155987
Oct. 8, 1982 [JP] Japan .................................. 57-176277

[51] Int. Cl.$^4$ ............................................. G06K 9/00
[52] U.S. Cl. ..................................... 382/41; 364/134; 364/900; 382/44; 382/48; 382/49
[58] Field of Search ....................... 382/41, 44, 48, 49, 382/69; 364/200 MS File, 900 MS File, 131, 133, 134

[56] References Cited

U.S. PATENT DOCUMENTS

| | | | |
|---|---|---|---|
| 3,938,102 | 2/1976 | Morrin et al. .......................... | 382/44 |
| 3,976,982 | 8/1976 | Eiselen .................................. | 382/44 |
| 4,120,049 | 10/1978 | Thaler et al. ........................ | 382/48 |
| 4,122,443 | 10/1978 | Thaler et al. ........................ | 382/48 |
| 4,309,691 | 1/1982 | Castleman ............................ | 382/49 |
| 4,434,502 | 2/1984 | Arakawa et al. ..................... | 382/41 |
| 4,443,855 | 4/1984 | Bishop et al. ........................ | 382/48 |
| 4,484,349 | 11/1984 | McCubbrey ........................... | 382/41 |

Primary Examiner—Leo H. Boudreau
Attorney, Agent, or Firm—Beall Law Offices

[57] ABSTRACT

Disclosed is an image processor that processes desired image data according to a program. In the image processor, the addressing desired pixels which is stored in an image memory is performed by an address processor, and a partial image taken out of the image memory by the address processor is written into a shared memory, and then data is drawn out from the shared memory by an operational processor to carry out operational processing. The address processor is provided with a buffer memory in which image data in a predetermined area is stored and successively renewed by an increment-/decrement designation for read and write operations.

31 Claims, 17 Drawing Figures

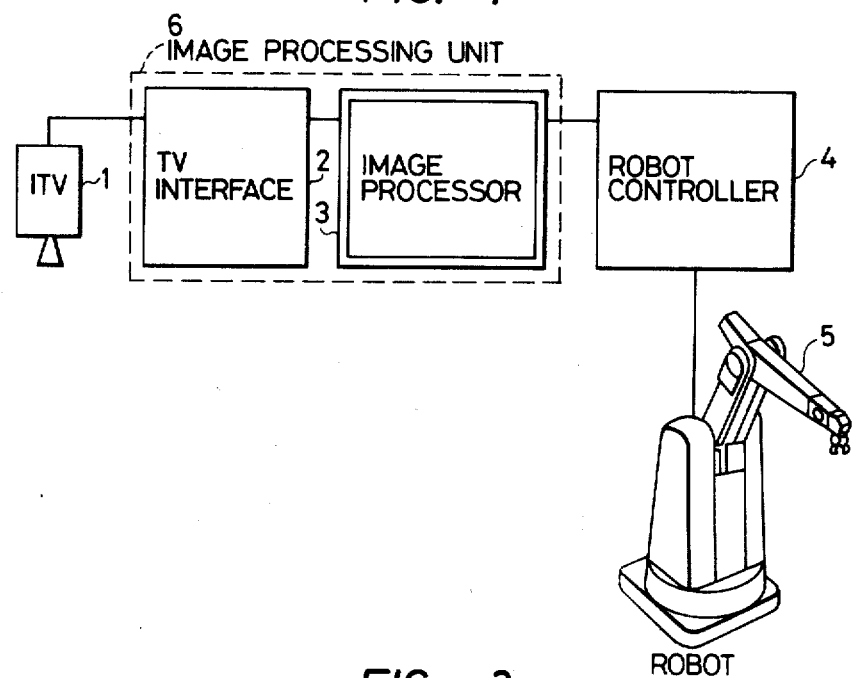
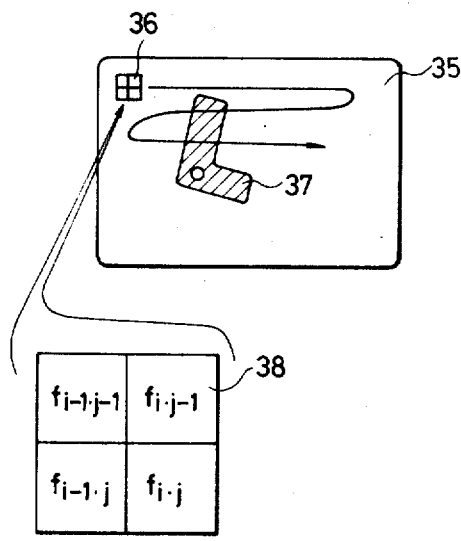

(a)
- (1) IX←R1
- (2) READ (MEM), INC (IX, 256)
- (3) W1←BF+R2, READ (MEM)
- (4) W1←W1+BF

(b)
- (1) IX←R1
- (2) READ (MEM)
- (3) W1←BF+R2
- (4) IX←IX+256
- (5) READ (MEM)
- (6) W1←W1+BF

FIG. 17

TABLE 1

| CONDITIONS | PROCESSING BY NEXT ADDRESS CONTROL CIRCUIT |
|---|---|
| START SIGNAL | ○ CLEAR IR1, IR2, PC1, PC2<br>○ LOAD START ADDRESS TO PC |
| μ-MEM HAS BRANCH INSTRUCTION BIT | ○ LOAD BRANCH ADDRESS TO PC |
| WAIT FLAG IS DOWN UNDER WAIT INSTRUCTION | ○ INHIBIT PC, IR1, IR2 FROM BEING RENEWED |
| LOOP COUNT CONDITION IS NOT SATISFIED UNDER SELF-LOOP INSTRUCTION | DITTO |
| BRANCH INSTRUCTION ACCORDING TO CONTENTS OF JX REGISTER | LOAD CONTENTS OF JX TO PC CLEAR IR1, IR2 |
| CONDITION IS NOT SATISFIED UNDER CONDITIONAL BRANCH INSTRUCTION | LOAD CONTENTS OF PC2 TO PC CLEAR IR1, IR2 |
| OTHER THAN THE ABOVE | INCREMENTALLY (+1) CHANGE CONTENTS OF PC |

PROGRAMMABLE IMAGE PROCESSOR

TECHNICAL FIELD

The present invention relates to a programmable image processor and more particularly to a highly-functional, industrial visual apparatus for use in a robot or other automatic machinery.

BACKGROUND ART

Conventional industrial visual apparatus include a partial pattern matching apparatus and a parallel image processor.

The partial pattern matching apparatus is a visual apparatus which is excellent in recognition accuracy and is widely used for transistor wire bonders and the like. However, the partial pattern matching apparatus has a fixed processing function and hence is not suitable for executing various algorithms at high speed in accordance with objects and purposes.

As a programmable parallel image processor, on the other hand, such an arrangement has been proposed that n×n parallel arithmetic circuits are disposed on a local memory able to shift in a multiplicity of directions. Such an apparatus, however, necessarily uses, as an image memory, an independent memory element corresponding to each pixel and, therefore, is uneconomical. In addition, the image processor takes much effort and time to make a decision on summarized data from the many special characteristics of many elements, and the parallel image processor is not good for treating the relationship between many memory elements.

In the image processing, generally, an operation is equally carried out over the whole screen area. For example, the screen area of a television or the like is divided into 256×240 meshes, and an operation is carried out on each mesh while a pixel to which attention is being paid is shifted by one mesh (pixel) from the left to the right or from the top to the bottom.

In this operation, it is a frequent practice to make a reference to peripheral pixels, e.g., 3×3 or 5×5 pixels, with the pixel to which attention is being paid at the center.

Accordingly, it is important to employ an arrangement of partial image memories and a control system therefor suitable for setting and making reference to such partial image data on the grounds of economy of the image processor of this type and for making the same more compact and higher in speed.

SUMMARY OF THE INVENTION

It is an object of the invention to provide an image processor allowing the processing contents to be easily changed by a program as well as permitting high-speed processing.

It is another object of the invention to provide an image processor capable of effecting address generation with respect to an image memory for storing image data economically and at high speed.

It is still another object of the invention to provide an image processor improved to allow a partial image memory to be more compact and economical.

To these ends, according to the invention, there is provided an image processor comprising: an image memory for digitizing and storing image data; an address processor adapted to effect addressing with respect to desired pixels on the image memory and draw out the corresponding pixel data on desired portions; a shared memory into which pixel data on desired portions are successively written from the address processor; and an operational processor adapted to receive the pixel data stored in the shared memory for each desired block and successively effect necessary scanning and processing.

BRIEF DESCRIPTION OF THE DRAWINGS

FIG. 1 shows an example of a system to which an image processor in accordance with the invention is applied;

FIG. 3 illustrates how an image is processed;

FIG. 17 contains Table 1 describing the operation of a decision control circuit under various operational conditions.

DESCRIPTION OF THE PREFERRED EMBODIMENT

Figure 2:
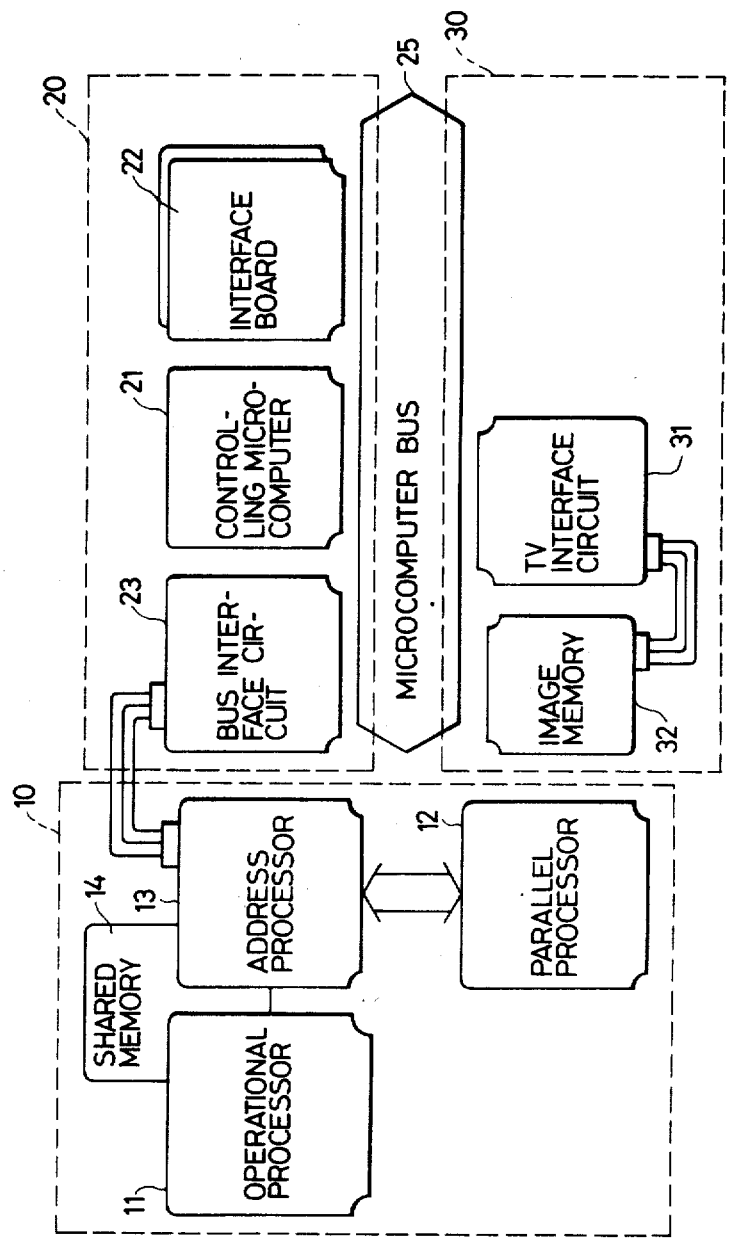
FIG. 2 shows the interior construction of the image processor in accordance with the invention.

An embodiment of the invention will be described hereinunder in detail with reference to the accompanying drawings.

FIG. 1 shows an example of a system to which an image processor in accordance with the invention is applied.

The image processing is generally conducted as follows. First, the image of an object is picked up by means of an industrial TV camera (ITV) 1. The image signals therefrom are fed to an image input interface circuit 2, which converts the analog data into digital data and at once stores the same in an internal image memory. The data in the image memory are analyzed by an image processor 3 to obtain positional data on an element such as an object or to inspect the appearance thereof and transmit the results to a controller 4. According to the data, the controller 4 controls a robot 5 or the like.

An image processing unit 6 is composed of the interface circuit 2 and the image processor 3. The invention mainly relates to the image processor.

The interior construction of the image processing unit will be explained hereinunder with reference to FIG. 2.

The image processing unit comprises a high-speed processor section 10 that processes a large amount of image data at high speed, a microcomputer section 20 that controls the high-speed processor section 10 thereby to effect a total control, and an interface section 30.

The high-speed processor section 10 is composed of an operational processor 11 for effecting various processes on images, a parallel processor 12 for effecting a product-sum operation-like processing, an address processor 13 for taking out pixel data on desired portions from an image memory and storing the data in a shared memory 14, and the shared memory 14 for transferring data between the address processor 13 and the operational processor 11, these processors and memory being interconnected with high-speed signal lines. On the other hand, the microcomputer section 20 is composed of a controlling microcomputer 21, an interface board 22 for memories and peripheral units, and a bus interface circuit 23, and is connected to the high-speed processor section 10 through the bus interface circuit 23 and the address processor 13.

The interface section 30 is composed of an TV interface circuit 31 and an image memory 32 associated therewith and is connected to the microcomputer section 20 through a microcomputer bus 25. The interface section 30 corresponds to the interface circuit 2 shown in FIG. 1, while the high-speed processor section 10 and the microcomputer section 20 in combination correspond to the image processor 3 shown in FIG. 1.

The reason that the high-speed processor section 10 is of multi-processor construction constituted by the address processor 13 and the operational processors 11, 12 will be explained hereinunder.

In the case of image processing, it is a frequent practice to subject the whole image to various kinds of preprocessing. The processing is such that, as shown in FIG. 3, a TV screen area 35 is generally divided into small meshes (each mesh is referred to as "pixel", hereinafter) numbering on the order to 256×240 or 512×480. The brightness of the screen area for each pixel is digitized in about six to eight bits and stored in the image memory and are then scanned from the upper left to the lower right of an image by means of a processing window 36 set so as to overlook a 2×2 array of pixels at a time to perform calculation. It is to be noted that, in FIG. 3, a reference numeral 37 denotes the image of an element as an object, while a numeral 38 designates the enlarged window 36. In this case, as an operator for extracting an edge of an image, the following equation called Roberts Gradient is employed:

$$Fij = max(|f(i,j) - f(i-1, j-1)|, |f(i-1, j) - f(i, j-1)|)$$

As will be understood from this processing, the same processing is carried out on the whole screen area, and the processing is effected through a regular scanning. Accordingly, the order of taking out data from the image memory is not effected by operations, and it is possible to effect data preparation in parallel to operations by previously reading out the subsequent data.

Therefore, by providing an address processor 13 that exclusively performs data preparation separately from the operational processors 11, 12, the processing speed can be made higher through the parallel processing. If the address processor is allowed to be program-controlled, it becomes possible to variously change the pattern for data preparation according to the image processing contents, thereby permitting optimum data preparation in accordance with the processing algorithm.

Figure 4:
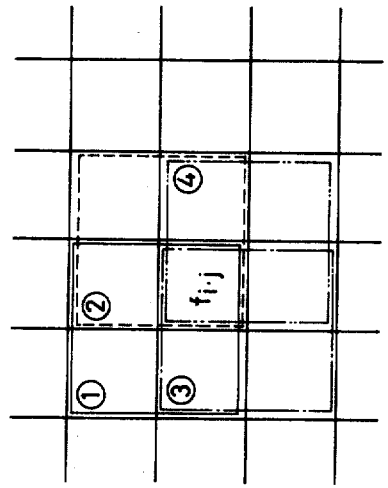
FIG. 4 illustrates how specific pixels are referred to by a 2×2 pixel window.

For a data processing operation such as shown in FIG. 3, it may be noted that a specific pixel is referred to a total of four times in one scanning in the case of a 2×2 pixel window and nine times in the case of a 3×3 pixel window, as shown in FIG. 4. Here, the window moves from 1 to 2 to make a reference for the operation on the subsequent one pixel, while the window moves from 2 to 3 to make a reference for the operation on the subsequent line.

Figure 5:
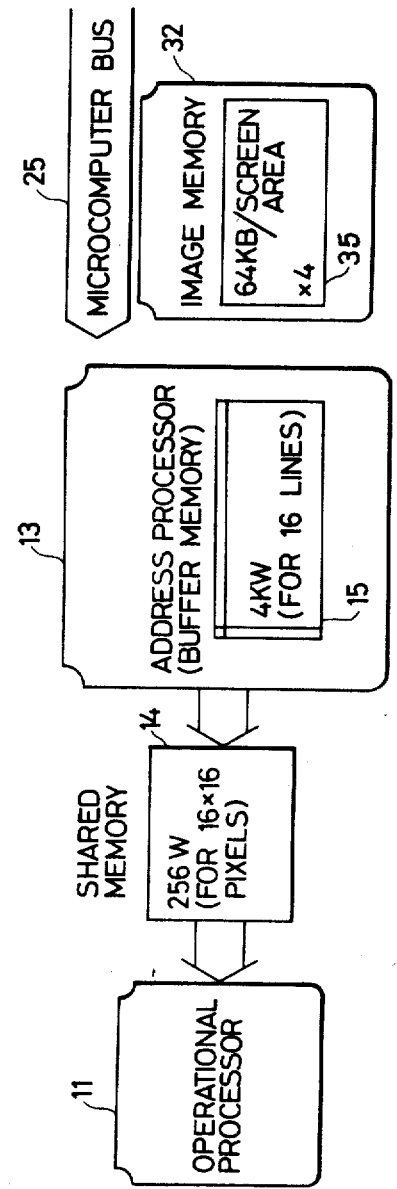
FIG. 5 shows the memory hierarchy construction of the image processor in accordance with the invention.

Since the scanning of the screen area is consecutively performed for each line, it will be understood that the data reference is concentrated on several specific lines during a certain period. Image memory 32 stores data on the pixels over the whole screen area and hence is required to have a large capacity: 64 kilo-bits for the division of 256×240 pixels/screen area; and 256 kilo-bits for the division of 512×480 pixels/screen area. If it is intended to constitute the image memory 32 with a memory having the high-speed performance required for image processing, the apparatus inevitably becomes large in size and high in price, since a memory element having a large capacity cannot be used. Therefore, a buffer memory 15 for temporarily holding the data on several lines on the screen area from the image memory 32 is provided in address processor 13, as shown in FIG. 5, by utilizing the fact that the reference data is limited to a comparatively small range, about several lines, at a certain period of time as mentioned above. The data repeatedly referred to are taken out from buffer memory 15 and set in the shared memory 14. As a result, the image memory 32 can employ a memory comparatively low in speed but large in capacity, thereby allowing the apparatus to be more compact and lower in price. It is to be noted that the reference numerals representing the various elements or parts in FIG. 5 correspond to those in FIG. 2.

Figure 6:
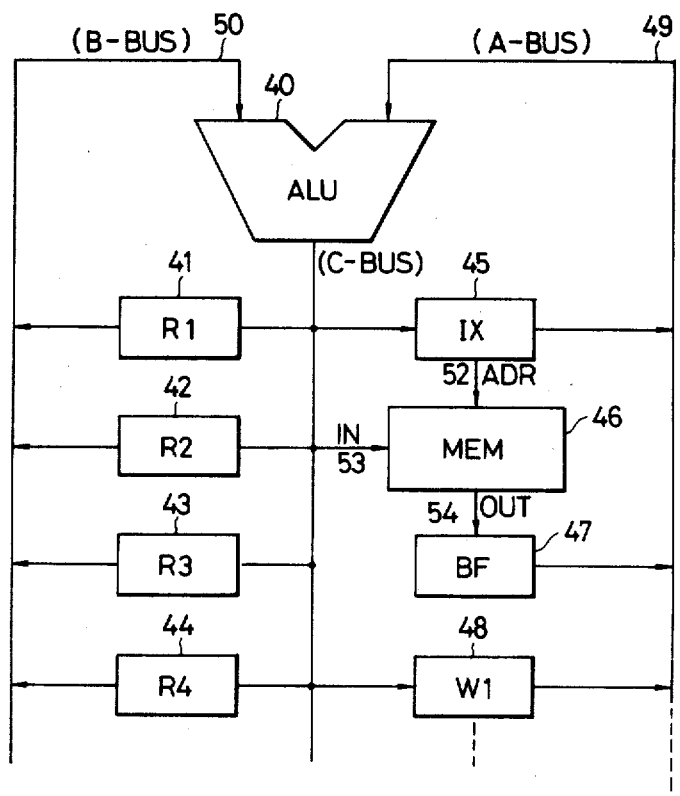
FIG. 6 shows the construction of a buffer memory and a control circuit.

The buffer memory 15 is disposed in the address processor 13, with the same arrangement as that of a memory 46 shown in FIG. 6. In this case, the address processor processes in an arithmetic circuit (ALU) 40 the data set by registers (one of an output buffer (BF) 47, a work register (W1) 48 and the like, and one of registers (R1 to R4) 41 to 44) selected and connected to an A-bus 49 and a B-bus 50, respectively, and delivers the result to a C-bus 51 to store a former in the register (R1 to R4, W1 or the like) on the C-bus 51 selected at that point of time.

Although data setting with respect to buffer memory 46 is also effected through the C-bus 51 and a data setting line 53, the data read out from the buffer memory 46 cannot be immediately delivered to the A-bus 49 since it takes some time to deliver data from the buffer memory 46. For this reason, the value of data is once set in an output buffer (BF) 47 through a data output line 54 and then the data is delivered to the A-bus 49. The setting of read/write addresses with respect to the buffer memory 46 is effected through an address setting line 52 via an index register (IX) 45 or by direct addressing. As described hereinbefore, since the data in the buffer memory 46 are used via the output buffer 47, two cycles are required to read out one data. If the readout address setting and the readout of data to the output buffer memory 47 are performed in parallel to each other, however, it becomes possible to read out data successively.

Figure 7:
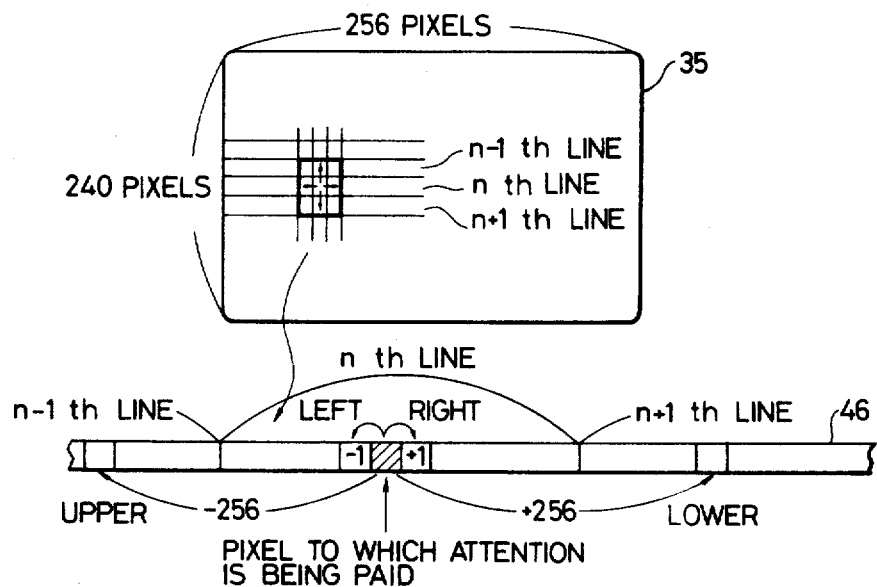
FIG. 7 illustrates how image data are stored in the buffer memory.
Figure 8:
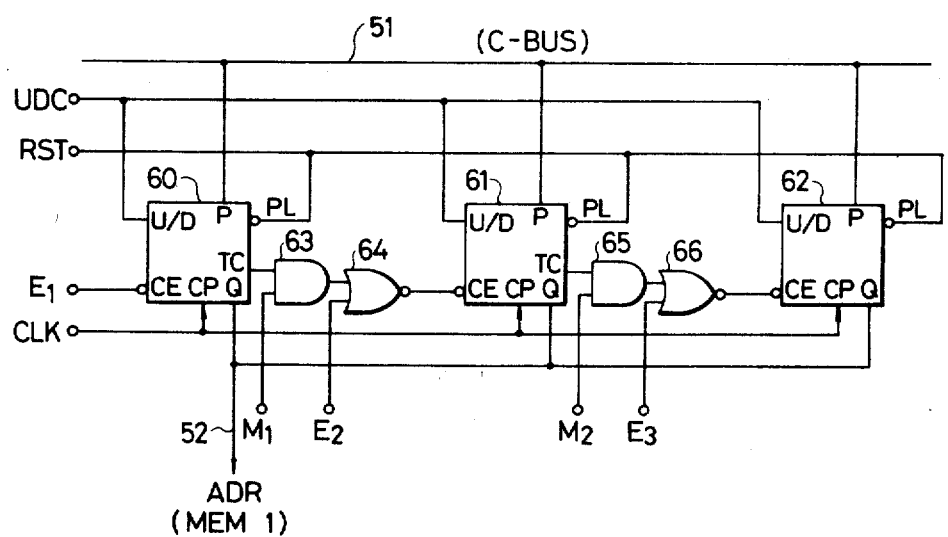
FIG. 8 shows an example of the construction of an index register in FIG. 6.

Buffer memory 46 is a buffer for storing data about several lines on a screen area divided into 256×240 pixels/screen area, for example. Data addresses in the buffer memory 46 are one-dimensionally arranged consecutively in the line direction as shown in FIG. 7. Accordingly, the pixel on the right of the pixel to which attention is being paid is assigned an address obtained by adding 1 to the present address; the pixel on the left side thereof is assigned an address obtained by subtracting 1 from the present address; the pixel on the upper side thereof is assigned an address obtained by subtracting 256 from the present address; and the pixel on the lower side thereof is assigned an address obtained by adding 256 to the present address. In the case of image processing, it is very frequently necessary to refer to the pixels adjacent to the pixel to which attention is being paid, as shown in FIG. 3 also. Therefore, the IX register 45 is constituted by up/down counters as shown in FIG. 8 and is permitted to effect an increment or decrement in the unit of four bits, thereby allowing the register to carry out operations such as $\pm 1$, $\pm 16$ and $\pm 256$. In FIG. 8, four-bit up/down counters 60 to 62 are the principal constituent elements of the register and are cascaded to form a twelve bit counter through which terminal count signals TC pass. In this case, the initial data setting to the IX register 45 is effected by a data load signal RST. The output value on the C-bus 51 is transferred to the register 45, and the initial set address value is loaded into each of the parallel data input terminals P of the respective counters 60 to 62. The counter value is renewed by applying to the counters 60 to 62 an increment/decrement designating signal UDC, either one of enabling signals E1, E2, E3, and a clock signal CLK. By applying the value from output terminals Q thereof to the buffer memory 46 as an address ADR, any desired pixel data can be read/written from/into the buffer memory 46. It is to be noted that mode designating signals M1, M2 correspond to $\pm 16$, $\pm 256$, respectively, and the $\pm 1$ mode requires no designation.

Figures 9, 10:
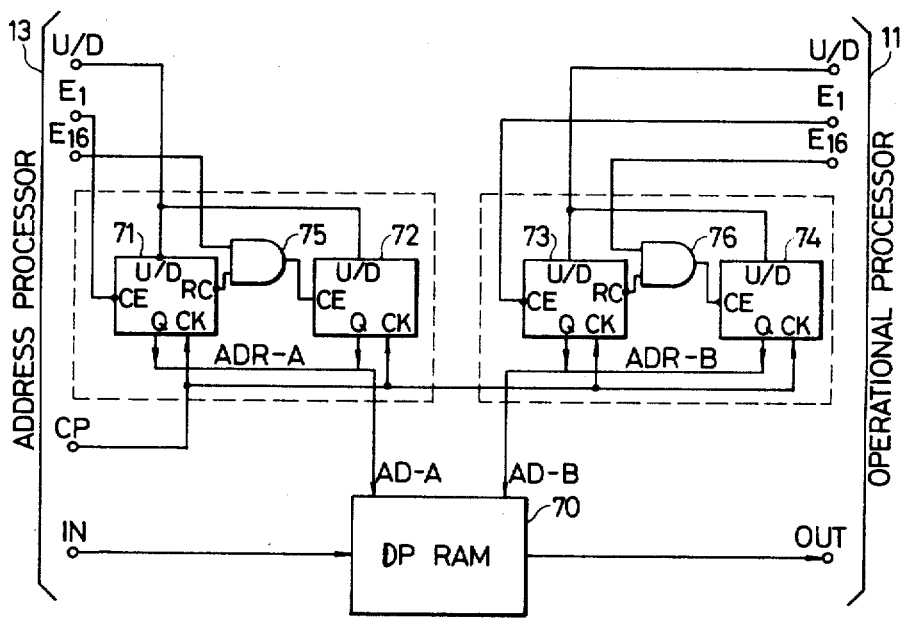
FIG. 9 shows an exemplary step construction (a) of a program formed in accordance with the index register shown in FIG. 6 and a conventional step construction (b)
FIG. 10 shows an example of a shared memory.

By thus constituting the IX register 45 by counters, it becomes possible to calculate a subsequent reference address in the buffer memory 46 in parallel to other operational processing or the buffer readout from the memory. As a result, the number of required program steps can be reduced as shown in FIG. 9. In addition, the image processing speed can be increased owing to the parallel processing. FIG. 9(a) shows an example of a program according to the system of the invention, while FIG. 9(b) shows an example of a program according to other systems, in which the IX register is not constituted by counters. As will be clear from the drawing, the program shown in FIG. 9(a) is higher in speed than that shown in FIG. 9(b) through the reduction in number of the program steps. It is to be noted that, in FIG. 9, a symbol ← denotes the storing of a value, while symbols READ, + and INC designate the readout from the memory, addition and the increment designation to the counter circuit, respectively.

The same is the case with the shared memory 14. In particular, the shared memory 14 is not required to have data on the whole of a line. Therefore, if the shared memory 14 is adapted to be able to store data on the subsequent line in a unit of sixteen data, it becomes possible to refer to the data on the right or left side of the present data by adding one to the present data or subtracting one therefrom, and the data on the upper or lower side of the present data by adding sixteen to the present data or subtracting sixteen therefrom. Thus, if data are stored in the shared memory 14 and used cyclically, data on the whole screen area can be continuously scanned through the window.

The construction of the shared memory and the method of controlling the same will be described hereinunder with reference to FIGS. 10, 11 and 12.

First of all, as shown in FIG. 10, the shared memory 14 comprises: a double-port random-access memory 70 (referred to as simply "DP RAM" hereinafter), as its main body, which can be accessed from the address processor 13 and the operational processor 11 simultaneously and can perform one read operation and one write operation during one processing cycle of these processors; and address registers ADR-A, ADR-B provided so as to correspond to the pixel data taking-out/-writing side (on the side of the address processor 13) and the pixel data reading-out side (on the side of the operational processor 11), respectively.

Moreover, the address register ADR-A is constituted by four-bit up/down counters 71, 72 and an AND gate 75, while the address register ADR-B is constituted by four-bit up/down counters 73, 74 and an AND gate 76.

Figure 11:
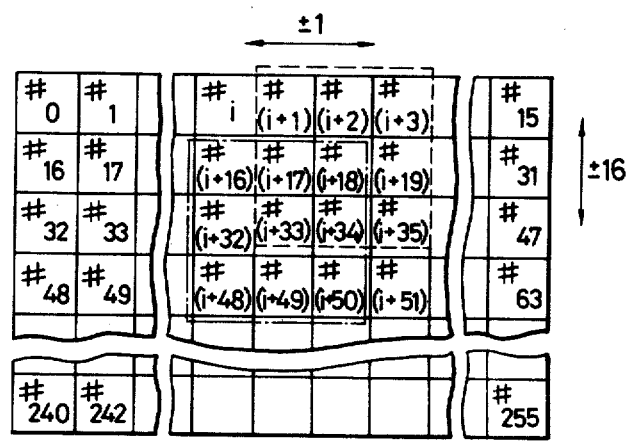
FIG. 11 shows the memory arrangement in the shared memory.
Figure 12:
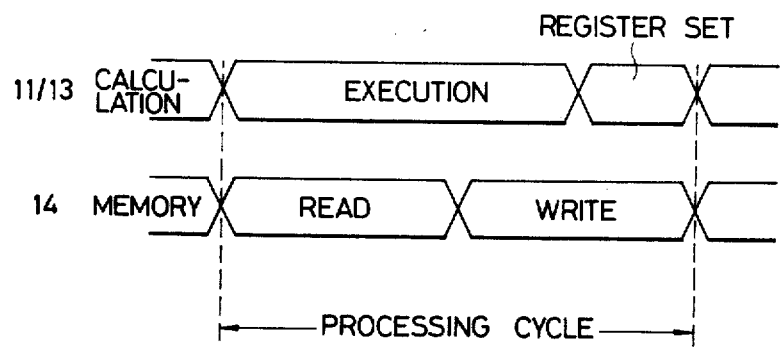
FIG. 12 is a time chart for the shared memory shown in FIG. 10.

The DP RAM 70 is an high-speed, medium-capacity integrated memory having 256 addresses, #0 to #255, for example, and allowing a storage of 16×16 pixel data as shown in FIG. 11.

The address registers ADR-A, ADR-B perform addressing with respect to the DP RAM 70 through the control from the address processor 13 and the operational processor 11 to allow the processors 13, 11 to carry out data write/read operations, respectively.

With respect to a $\pm 1$ increment/decrement, by applying to the up/down counters 71, 73 control signals E1 (e.g., a low-level signal) and U/D signals (e.g., a low-level signal for the up-counting; a high-level signal for the down-counting), desired address outputs AD-A, AD-B can be obtained according to the results of counting clock pulses CP applied thereto.

With respect to a $\pm 16$ increment/decrement, similarly, desired address outputs AD-A, AD-B can be obtained by applying to the up/down counters 72, 74 control signals E16 (e.g., a low-level signal) via the AND gates 75, 76, together with the control signals U/D, respectively.

Thus, for example, in case of effecting a reference read with a performing scanning by 3×3 pixel data array as shown in FIG. 11, when the pixel to which attention is being paid is moved from a central address #(i+17) to a central address #(i+18) (i.e., a+1 increment is effected), it is only required to change three pixel data: address #(i+3), #(i+19) and #(i+35).

On the other hand, a+16 increment can be effected simply by renewing three pixel data: addresses #(i+48), #(i+49) and #(i+50).

It will be obvious that a−1 or −16 decrement can be similarly effected simply by renewing three pixel data.

It is to be noted that, in the above-mentioned cases, the address processor 13 performs the following microprogram operation, for example. The operation permits data to be stored successively and continuously and hence is reduced in time required for the operation, thereby providing a higher speed than the conventional process.

CX=R1
PIM (CX)=R2, INC (CX, 16)
PIM (CX)=R3, INC (CX, 16)
PIM (CX)=R4
R1=R1+1 where CX and PIM are expressions with respect to the address register ADR-A and the shared memory 14; R1 denotes a work register for a top pointer; R2, R3, R4 designate work registers for data to be stored in the shared memory 14; and INC represents an increment.

Thus, it is possible to take out from the large-capacity image memory 32 a partial image having a high frequency in use at each point of time and transfer the same to the operational processor 11 through the shared memory 14.

More specifically, by effecting an increment or decrement in a desired unit, such as ±1, ±16 and the like, according to the partial image memory arrangement, it is possible to easily access an adjacent pixel. In addition, since the operation of the image memory is independent of the processors 13, 11 and the like, a higher-speed processing is made possible.

Moreover, as the memory element for the shared memory 14, it is possible to employ a memory having a comparatively large capacity, since the movement for one pixel can be effected simply by renewing data for one line and a read or write operation is carried out through address allocation. Therefore, the whole apparatus can be made compact through simplification of the circuit and the like.

Figure 13:
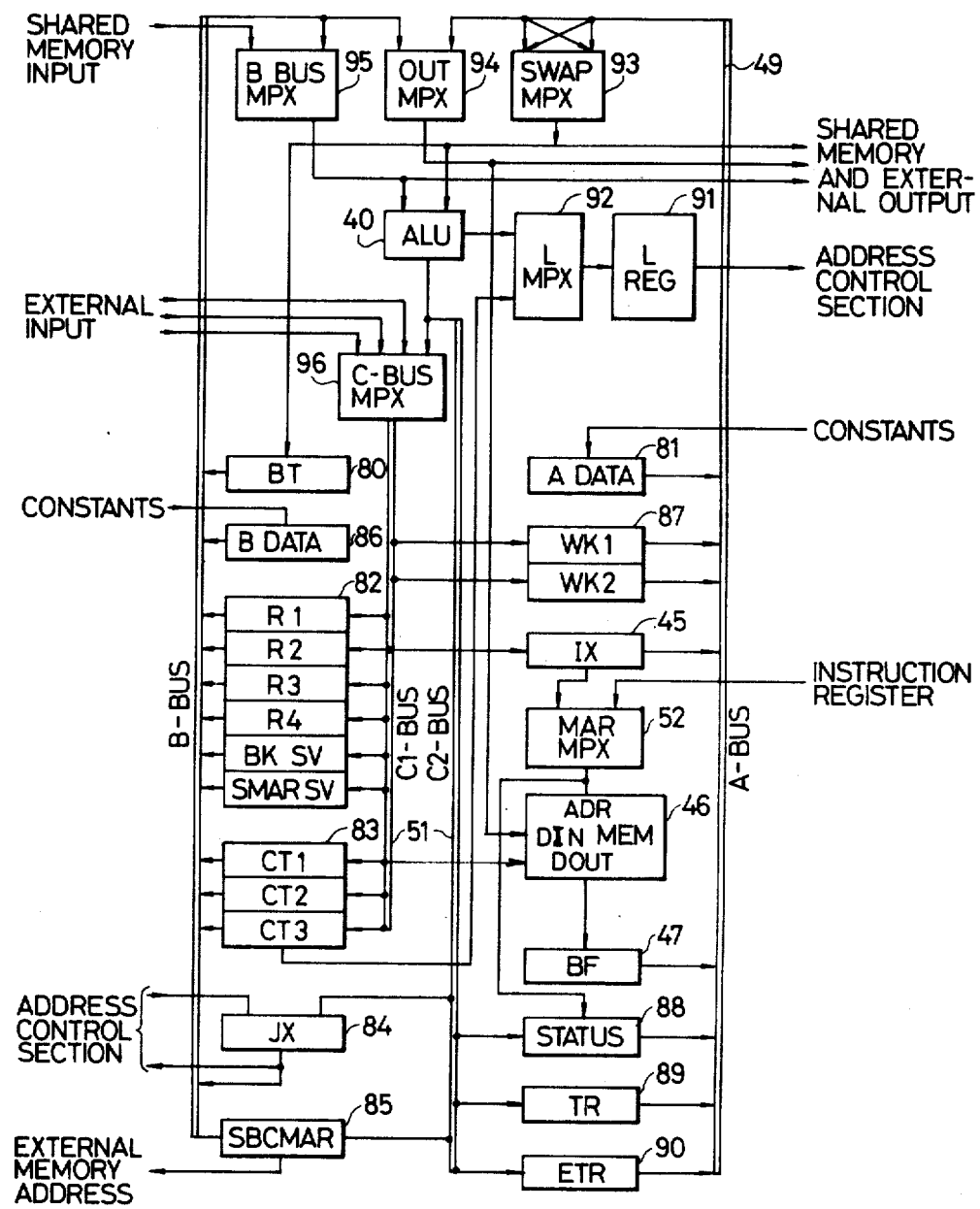
FIG. 13 is a circuit diagram of an example of each of an address processor and an operational processor.

FIG. 13 shows the register arrangement of the address processor and the operational processor in accordance with the invention. The processors adopt the same register arrangement. In the Figure, work registers 82, 87 (R1 to R4, BKSV, SMARSV; and WK1, WK2) are simply 16-bit registers. However, a loop counter 83 (CT1 to CT3) is an eight-bit counter adapted such that, by initially setting a value and then outputting a count designation, the counter subtracts one from the value every time the designation is delivered, and makes a condition-satisfied flag 91 (LFLAG) zero at the point of time when the value changes from 0 to −1 while making the flag 91 one in the other cases. According to the contents of the flag, if a conditional branch instruction is issued, the control is branched to a designated address and repeats the same instruction. In the Figure, a byte inverting multiplexer 93 (SWAP MPX) is a circuit for inverting the high and low orders of 16-byte data. By using the multiplexer 93, the high order portion of 2-byte data can be easily taken out. When a value is set in a bit number counter circuit 80 (BT) and the next value is read, the number of high bits in the 16 bits of the set data is read out. A subroutine processing register 84 (JX) is a subroutine constructing register, to which a return address is set in executing a branch instruction calling a subroutine. A subroutine is constructed by combining the instruction with the branch instruction for the control to branch to the address set therein. TR and ETR registers 89 and 90 are shift registers which can shift 16-bit data solely or 32-bit data in combination.

Thus, the circuit in accordance with the invention is arranged such that it is possible to effect, in parallel, the read and write operation with respect to the buffer memory 46 (MEM), the loop number counting by the counters CT1 to CT3, the shift processing by the TR and ETR registers, the high-bit number counting by the BT circuit, the subroutine processing by the use of the JX register and so forth, in parallel to the operations via the arithmetic circuit 40 (ALU), thereby contriving a higher speed through the simultaneous execution of a plurality of processes. It is to be noted that, in FIG. 13, the same reference numeral as those in FIG. 6 represent the same members or parts, and numerals 81, 86 denote constants data setting registers (ADATA, BDATA), while numerals 85 and 88 designate an SBC address register (SBC MAR) and a status register (STATUS) respectively. In addition, reference numerals 92, 94, 95, 96 and 97 represent multiplexers for condition selection, output, B-bus signal selection, C-bus signal selection and address selection, respectively.

Figure 14:
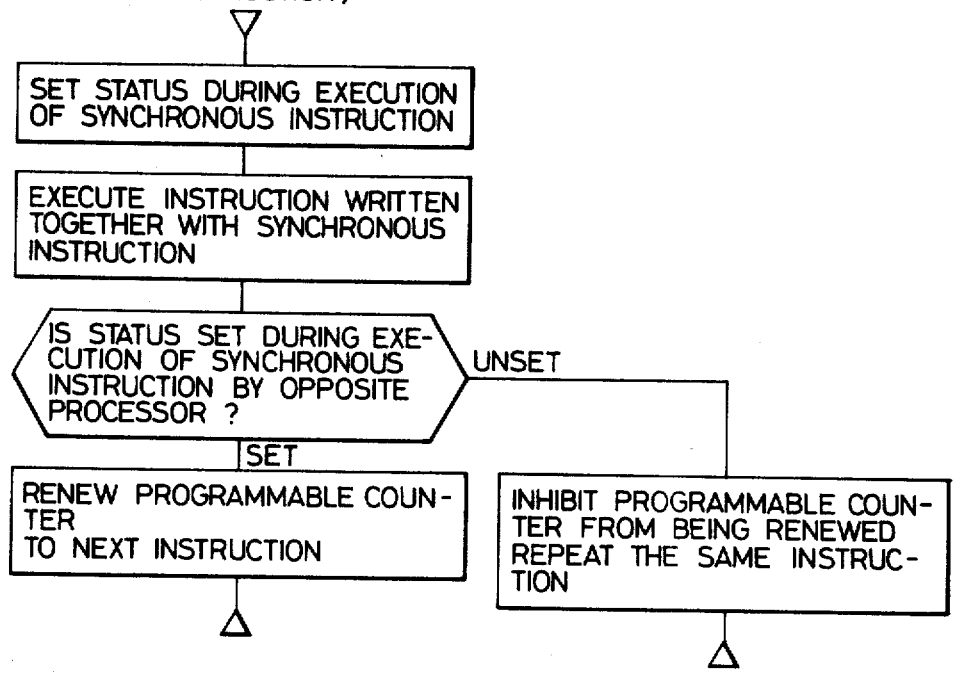
FIG. 14 is a flow chart for describing how a programmable counter is controlled when a synchronous instruction is executed.

The synchronizing method for the processors of this apparatus will be explained hereinunder with reference to FIG. 14. The address processor 13 and the operational processor 11 proceed to the subsequent instruction on realization of a synchronous relationship therebetween which is established when the processors have simultaneously executed the synchronous instructions for the processors opposite to each other in the same cycle of instruction words. When the synchronous instruction is executed by only one of the processors, the programmable counter, on the same processor side which controls the proceeding of a program is inhibited from being reset, and the processor proceeds to a repetitive cycle of the same instruction. The processing in one cycle of the instruction is schematically shown in FIG. 14.

It is to be noted that the synchronism for the read/write end with respect to the image memory 32 or the like on the microcomputer side via the microcomputer bus I/F 23 is effected by checking an end flag. When the end flag is down, the programmable counter is inhibited from being reset.

Figure 15:
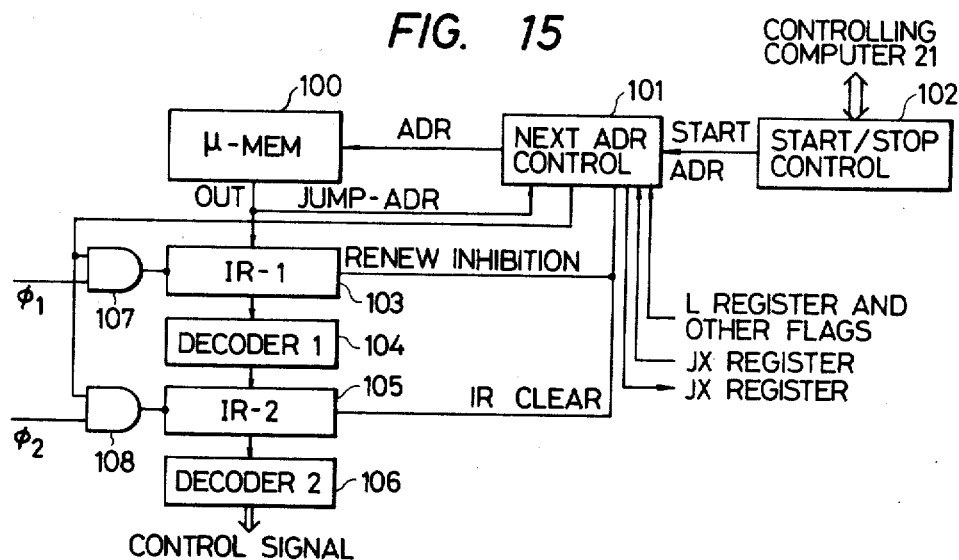
FIG. 15 shows the construction of a control section for controlling the processing of instructions.

The construction of the instruction processing control section related to the above is shown in FIG. 15. The instruction words for the image processor are placed in an instruction word memory 100 ($\mu$-MEM) separately from the image data and are read out, executed and controlled in parallel to the reading/writing of the image data, thereby contriving a higher speed. The instruction words are executed in a two-stage pipeline-like manner by using instruction registers 103 (IR-1), 105 (IR-2) for storing decoded results of instructions. The processing of instructions is controlled by a next address control circuit 101 according to the instruction from the controlling microcomputer 21 via a start/stop control circuit 102. If a reset inhibiting signal is generated while the L register signal and the like are observed, the contents of the instruction registers IR-1, IR-2 are held as they are. As a result, the same instruction is repeated. Moreover, when a conditional branch instruction transfers the control to the instruction side not decoded by means of the pipeline, the IR-1 and IR-2 registers are cleared by an IR clear signal, and a dummy cycle of an ineffective instruction is executed until a new instruction is fetched. It is to be noted that reference numerals 104, 106 denote decoders, while numerals 107, 108 designate AND gates. In addition, symbols $\phi_1$, $\phi_2$ represent timing clocks.

Figure 16:
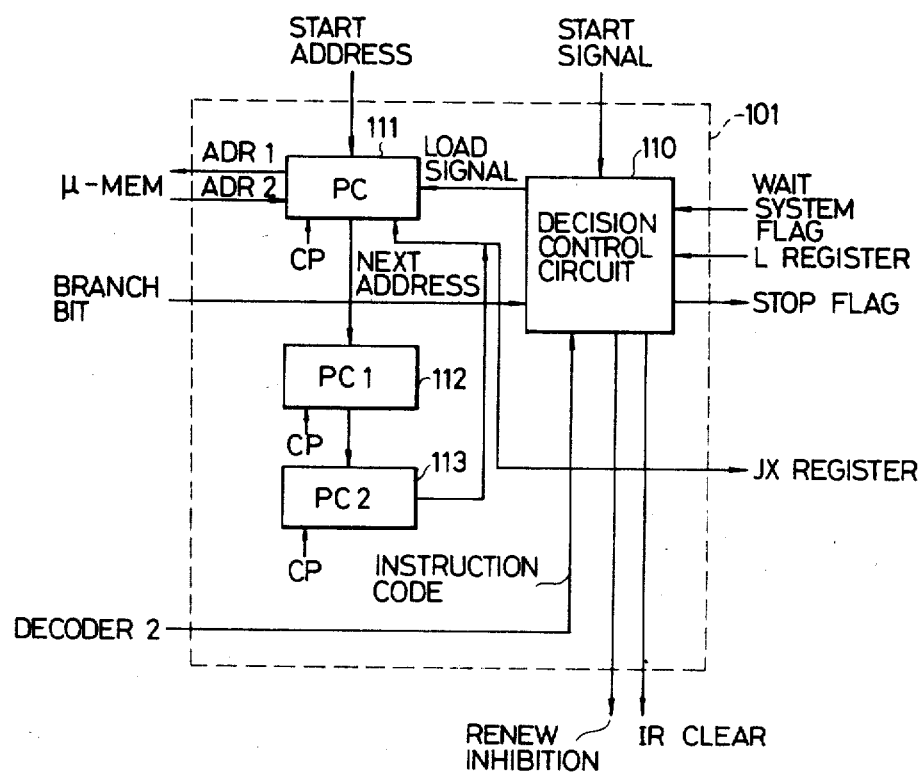
FIG. 16 shows the construction of a next address control circuit in FIG. 15.

The construction of the next address control circuit 101 is shown in FIG. 16.

The next address control circuit 101 provides that when a branch system instruction is issued, the next address control circuit 101 controls the pipeline control mechanism so as to decode the branch side first. In the case of image processing, the same is carried out on the whole of the screen area with a comparatively short loop, as shown in FIG. 3. Therefore, the generation of a dummy cycle when the preceding decode fails in the pipeline processing according to a conditional branch instruction, the failure causes a 10 to 20% reduction in efficiency. It should be noted, that in the repetitive processing on the pixels, the loop processing is effected by the branching to the top and is repeated 64,000 times for the whole screen area before leaving the routine. Therefore, it is more efficient to develop the branch side first. For this reason, a decision control circuit 110 checks a branch system instruction at the point of time when the instruction words are read out from the μ-MEM 100, and rewrites the address of an instruction word programmable counter 111, thereby developing the branch side first. It is to be noted that the address in case of moving to the next instruction without branching is processed by preserving the next instruction address for two cycles by the use of programmable counter preserving registers 112, 113 (PC1, PC2) and loading the contents of the PC2 to the PC. The operation of the decision control circuit 110 in FIG. 17 as each case is shown in Table 1.

It is to be noted that if the L flag sets of the reset inhibiting circuit and the loop counter shown in FIGS. 15, 16 are combined together, then it is possible to form a self-loop instruction which orders the same instruction to be repetitively executed until the content of the loop counter is 0. This instruction is effective for cutting out specific bits, clearing the memory, continuously reading out data and so forth.

The following is the description of the operation of this circuit. When the control signal from a decoder 106 includes a self-loop instruction designating bit which is up, and if a count designating bit for the loop counters CT1 to CT3 is up, a decrement is effected thereby on the designated loop counter. When the count result is "0", an L register flag is set. When the self-loop instruction designating bit is up, the decision control circuit refers to the L flag, and when the flag is down, the decision control circuit downs the instruction renewing inhibiting bit. As a result, the contents of the instruction registers (IR-1, IR-2) are not renewed, so that the same instruction is repeated.

What is claimed is:

1. A programmable image processor, comprising:
an image memory for digitizing and storing image data;
an address processor adapted to effect addressing with respect to desired pixels on said image memory and draw out the corresponding pixel data on desired portions;
a shared memory into which pixel data on said desired portions are successively written by said address processor; and
an operational processor adapted to receive the pixel data stored in said shared memory for each of said desired portions and successively effect necessary scanning and processing of the pixel data;
said shared memory being simultaneously accessible by said address processor and said operational processor to perform one read and one write operation on said pixel data during each processing cycle of said address processor and operational processor.

2. An image processor according to claim 1, wherein said address processor further comprises a buffer memory operatively interconnected between said image memory and shared memory, said buffer memory being adapted to receive from said image memory pixel data on a set of repetitively referred to pixels and to store the same and set said repetitively referred to data in said shared memory.

3. An image processor according to claim 2, further comprising an address register for effecting address control of said buffer memory and perform read and write operations on said buffer memory by effecting an arithmetic change on the address of a memory location containing data about a first pixel to which attention is being paid and thereby obtain an address of a memory location containing data about a second pixel adjacent to said first pixel.

4. An image processor according to claim 1, wherein said shared memory can be addressed independently by both of said address processor and said operational processor, and has a mechanism capable of arithmetically changing an address in accordance with one of a read or write operation.

5. An image processor according to claim 1, further comprising:
an instruction word memory discrete from said image memory for storing a processing program separately from said image data; and
a mechanism adapted to be able to read out subsequent instruction data from said instruction word memory while operating upon said image data in accordance with a preceding instruction.

6. An image processor according to claim 1, further comprising means for controlling said address processor and operational processor, including means for effecting the execution of instruction words sequentially and taking out and decoding instruction words after a conditional branch instruction is issued, and for giving priority to decoding the branch side of each of said instruction words.

7. An image processor according to claim 1, further comprising:
a loop counter for controlling the repetition of read/write operations with respect to said image memory and a plurality of other operations; and
means for executing an instruction repetitively in a number of instruction cycles determined by the count processing of said loop counter.

8. A programmable image processor comprising:
an image memory that scans a desired screen area in a predetermined pixel number and stores image data from each of a plurality of pixels in a scanning order;
an address processor for effecting addressing of said image memory for desired pixels and taking out image data on desired portions from said image memory, said address processor having, as an address register with respect to said image memory, an index register capable of performing arithmetic operations according to an increment/decrement designation for generation of addresses of pixels, adjoining a pixel to which attention is being paid;
a shared memory accessible by said address processor for transferring image data from said address processor; and an operational processor for accessing said shared memory sumiltaneously with said address processor and for effecting data processing with respect to said image data on said desired portions.

9. A programmable image processor according to claim 8, wherein said index register is constituted by a plurality of up/down counters interconnected in a cascade configuration to receive ripple-through carry signals.

10. A programmable image processor according to claim 8, wherein said address processor further comprises a buffer memory operatively interconnected between said image memory and said shared memory, said buffer memory being suitable for performing processes of receiving said image data from said image memory, and said address register being coupled to said buffer memory and conducting read and write operations on said buffer memory after performing said arithmetic operations.

11. An image processor according to claim 10, wherein said buffer memory and said address register are each controllable by said address processor to simultaneously complete one of said processes and operations, respectively.

12. An image processor according to claim 10, wherein said buffer memory has a lesser memory capacity than said image memory.

13. An image processor according to claim 12, wherein said shared memory has a lesser memory capacity than said buffer memory.

14. An image processor according to claim 10, wherein said shared memory can be addressed independently by both of said address processor and said operational processor.

15. An image processor according to claim 14, further comprising:
an instruction word memory discrete from said image memory for storing a processing program separately from said image data; and
a mechanism suitable for reading out a subsequent instruction from said instruction word memory while operating upon said image data in accordance with a preceding instruction.

16. An image processor according to claim 8, further comprising means for controlling said address processor and operational processor, including means for effecting execution of instruction words sequentially and taking out and decoding instruction words after a conditional branch instruction is issued, and for giving priority to decoding the branch side of each of said instruction words.

17. An image processor according to claim 8, further comprising:
a loop counter for controlling the repetition of read/write operations with respect to said image memory and a plurality of other operations; and
means for executing an instruction repetitively in a number of instruction cycles determined by the count processing of said loop counter.

18. A programmable image processor, comprising:
an image memory for digitizing and storing image data from a plurality of pixels;
an address processor suitable to effect addressing of said image memory to obtain image data on selected ones of said pixels;
a shared memory into which said image data from desired portions of said image memory is successively written by said address processor;
said address processor including a buffer memory interconnected between said image memory and shared memory, said buffer memory being suitable to perform the processes of receiving from said image memory data on a set of repetitively referred to portions of said image memory, storing said data from said repetitively referred to portions, and setting in said shared memory said data from said repetitively referred to portions, and an address register for effecting address control of said buffer memory and for performing read and write operations on said buffer memory by completing arithmetic changes of address;
an operational processor adopted to receive said image data stored in said shared memory for each of said desired portions and successively effect scanning of said image memory and processing of said image data; and
said shared memory being simultaneously accessible by said address processor and said operational processor to perform one read and one write operation during one processing cycle of said address processor and operational processor.

19. An image processor according to claim 18, wherein said buffer memory and said address register are controllable by said address processor to both simultaneously complete one of said processes and operations, respectively.

20. An image processor according to claim 19, wherein said buffer memory has a lesser memory capacity than said image memory.

21. An image processor according to claim 20, wherein said shared memory has a lesser memory capacity than said buffer memory.

22. A programmable image processor, comprising:
an image memory for digitizing and storing image data;
an address processor adapted to effect addressing with respect to desired pixels on said image memory and draw out the corresponding pixel data on desired portions;
a shared memory into which pixel data on said desired portions is successively written by said address processor;
an operational processor adapted to receive the pixel data stored in said shared memory for each of said desired portions and successively effect scanning and processing of said pixel data; and
means for controlling said address processor and operational processor, including means for effecting the execution of instruction words sequentially and taking out and decoding instruction words after a conditional branch instruction is issued, and for giving priority to decoding the branch side of each of said instruction words.

23. An image processor according to claim 22, wherein said address processor has, as an address register with respect to said image memory, an index register capable of performing arithmetic operations according to an increment/decrement designation for generation of addresses of pixels adjoining a pixel to which attention is being paid.

24. A programmable image processor according to claim 23, wherein said address processor further comprises a buffer memory operatively interconnected between said image memory and said shared memory, said buffer memory being suitable for performing processes of receiving said image memory, and said address register being coupled to said buffer memory for effecting address control of said buffer memory and conducting read and write operations on said buffer memory after performing said arithmetic operations.

25. A programmable image processor, comprising:
an image memory for digitizing and storing image data;
an address processor adapted to effect addressing with respect to desired pixels on said image memory and draw out the corresponding pixel data on desired portions;
a shared memory into which pixel data on said desired portions is successively written by said address processor;
an operational processor adapted to receive the pixel data stored in said shared memory for each of said desired portions and successively execute scanning and processing of said pixel data;
a loop counter for controlling the repetition of read/write operations with respect to said image memory and a plurality of other operations; and
means for executing an instruction repetitively in a number of instruction cycles determined by the count processing of said loop counter.

26. An image processor according to claim 25, wherein said address processor has, as an adddress register with respect to said image memory, an index register capable of performing arithmetic operations according to an increment/decrement designation for generation of addresses of pixels adjoining a pixel to which attention is being paid.

27. A programmable image processor according to claim 26, wherein said address processor further comprises a buffer memory operatively interconnected between said image memory and said shared memory, said buffer memory being suitable for receiving image data from said image memory, and said address register being coupled to said buffer memory for effecting address control of said buffer memory and conducting read and write operations on said buffer memory after performing said arithmetic operations.

28. A programmable image processor, comprising:
image memory means for scanning a desired screen area in a predetermined pixel member and storing image data for each of a plurality of pixels in a scanning order;
an address processor for effecting addressing of said image memory for desired pixels and taking out image data on desired portions from said image memory, said address processor having, as an address register with respect to said image memory, an index register capable of performing arithmetic operations according to an increment/decrement designation for generation of addresses of pixels adjoining a pixel to which attention is being paid, said index register being constituted by a plurality of up/down counters interconnected in a cascade configuration to receive carry signals;
a shared memory into which image data on said desired portions is successively written by said address processor; and
an operational processor for effecting data processing with respect to said image data on said desired portions.

29. An image processor according to claim 28, wherein said address processor further comprises a buffer memory operatively interconnected between said image memory and said shared memory, said buffer memory being suitable for performing processes of receiving said image data from said image memory, and said address register being coupled to said buffer memory for effecting address control of said buffer memory and conducting read and write operations on said buffer memory after performing said arithmetic operations.

30. An image processor according to claim 29, wherein said buffer memory and said address register are each controllable by said address processor simultaneously complete one of said processes and said operations, respectively.

31. An image processor according to claim 30, further comprising:
an instruction word memory discrete from said image memory for storing the processing program separately from said image data; and
a mechanism suitable for reading out a subsequent instruction from said instruction word memory while operating upon image data in accordance with a preceding instruction.

* * * * *